United States Patent [19]
Zakrzewski

[11] Patent Number: 4,460,552
[45] Date of Patent: Jul. 17, 1984

[54] PROCESS FOR THE SEPARATION OF AIR COMPONENTS, SUCH AS DIFFICULTLY ABSORBABLE AIR IMPURITIES, OUT OF AIR-GAS MIXTURES

[75] Inventor: Erhard Zakrzewski, D-Höhr-Grenzhausen, Fed. Rep. of Germany

[73] Assignee: Steuler Industriewerke, G.m.b.H., D-Höhr-Grenzhausen, Fed. Rep. of Germany

[21] Appl. No.: 267,407

[22] Filed: May 26, 1981

[51] Int. Cl.³ ............................................ B01D 53/34
[52] U.S. Cl. .................... 423/210; 423/224; 423/234; 423/235; 423/238; 423/240; 423/241; 423/242; 423/245; 55/68; 55/73; 55/387; 55/522; 55/526; 261/98; 422/3; 422/4; 422/110; 422/111
[58] Field of Search ............... 423/210, 224, 234, 235, 423/240, 242, 238, 241, 245; 55/522, 524, 525, 387, 68, 73; 261/94–98; 422/3, 4, 110, 111

[56] References Cited

U.S. PATENT DOCUMENTS

| | | | |
|---|---|---|---|
| 2,935,375 | 5/1960 | Boucher | 423/210 |
| 3,171,820 | 3/1965 | Volz | 55/528 X |
| 3,268,296 | 8/1966 | Hall et al. | 423/481 X |
| 3,453,071 | 7/1969 | Schmitt et al. | 423/235 |
| 3,522,692 | 8/1970 | Brookman et al. | 261/98 X |
| 3,905,774 | 9/1975 | Kotting | 423/210 |
| 3,969,479 | 7/1976 | Lonnes et al. | 423/210 |
| 4,011,304 | 3/1977 | Mancini et al. | 423/224 V |
| 4,145,399 | 3/1979 | Nagaoka et al. | 423/235 |
| 4,341,747 | 7/1982 | Downey | 423/235 |

Primary Examiner—Earl C. Thomas
Attorney, Agent, or Firm—Renner, Kenner, Greive & Bobak

[57] ABSTRACT

The present invention provides an apparatus and process for separating and removing chemical impurities from air which impurities are difficult to absorb. The apparatus for carrying out the process of the present invention comprises a reaction tower (11, 51, 91) into which the air-gas mixture is fed, aperture means (35, 74, 96) in a wall (16, 60, 98) of the tower, at least one filter means (12, 52, 92) carried in the reaction tower, means for distributing (13, 58, 93) an absorbent medium onto the filter, collecting means (14, 54, 94) beneath the filter for collection of the absorbent medium passing through the filter, and fan means (15, 55, 95) provided in the aperture for creating a flow of air through the reaction tower for the separation of substantially all of the impurities therefrom. The process of the present invention for the separation of chemical air impurities from air-gas mixtures comprises the steps of distributing an absorbent medium over at least one pack of stratified filter mats carried in a reaction tower, introducing the air-gas mixture to the filter mats and, creating a flow of air through the tower whereby the air-gas mixture is drawn through the filter mats and exits from the tower substantially free of chemical impurities. Absorbent medium such as caustic soda, sodium hypochlorite, water, hydrogen peroxide and mixtures thereof is particularly useful.

11 Claims, 3 Drawing Figures

PROCESS FOR THE SEPARATION OF AIR COMPONENTS, SUCH AS DIFFICULTLY ABSORBABLE AIR IMPURITIES, OUT OF AIR-GAS MIXTURES

TECHNICAL FIELD

The present invention is directed toward a process for the separation and removal of air components, such as difficulty absorbable chemical air impurities, from air-gas mixtures. The invention also provides apparatus for carrying out the process. Chemical impurities that become mixed with air arise from various industrial processes such as the production of nitric acid, nitration processes, and pickling processes wherein metals are pickled or dissolved in nitric acid or mixtures containing nitric acid. From these processes, oxides of nitrogen are evolved which require removal from air. Although a number of systems are known for filtering impurities from air and air-gas mixtures, they are only partially effective for the removal of impurities that are difficult to absorb.

BACKGROUND ART

Air-gas mixtures, containing air components or impurities such as an oxide of nitrogen, hydrogen chloride, sulfur dioxide, hydrogen sulfide, mercaptans and amines have heretofore been treated with absorbents for impurity removal. Such treatments involve the combining of the impurity-laden air-gas mixtures with absorbents such as for example, caustic soda, caustic soda-sodium hypochlorite, water or hydrogen peroxide and mixtures of the foregoing, in absorption installations with plate columns, packed columns, spray washers or Venturi washers. The degree of separation achieved with such installations, is dependent upon the nature of the separated medium and the selected form of installation. As such, it has occasionally been good but is more often only fair and even poor. When employing the spray or Venturi washers for nitrogen dioxide and nitrogen trioxide removal, it has been possible to achieve degrees of separation on an order of 30 to 70 percent; however, higher degrees of separation including up to 80 percent have been achievable only with resort to very expensive installations, such as 10-story plate columns or packed columns with packings of 4 to 6 meters. Nevertheless, only very low degrees of separation have resulted in the instance of nitrogen oxide removal, in fact, when using caustic soda or water as the absorbent, separation levels have been less than 10 percent and could not be increased beyond 30 percent where even caustic soda-sodium hypochlorite and hydrogen peroxide have been employed together.

DISCLOSURE OF THE INVENTION

It is therefore an object of the present invention to provide an apparatus and process for the separation of chemical impurities from air-gas mixtures, which impurities are normally difficult to absorb such as the oxides of nitrogen, hydrogen chloride, sulfur dioxide, hydrogen sulfide, mercaptans, amines and the like.

It is another object of the present invention to provide an apparatus and process for the separation of impurities, as set forth above, which does not require the use of expensive plate columns or packed columns; which achieves a significantly higher degree of separation than existing systems with relatively low expense and, which can simultaneously separate other impurities that are difficult to absorb such as sublimates of ammonium chloride, ammonium bifluoride, indium chloride, zinc chloride and aerosols of oils, of fats and plasticizers which are emulsifiable in the aqueous phase.

It is yet another object of the present invention to provide an apparatus and process that can be utilized to absorb sulfuric acid aerosols and sulfur trioxide in water rather than sulfuric acid.

These and other objects, together with the advantages thereof over known processes and apparatus, which shall become apparent from the specification which follows, are accomplished by the invention as hereinafter described and claimed.

The present invention allows the elimination of expensive plate columns or packed columns and achieves significantly higher degrees of separation at relatively low expense while at the same time also separating other difficulty absorbable air constituents, for example soluble sublimates such as ammonium chloride, ammonium bifluoride, indium chloride and zinc chloride, with good degrees of separation. Even difficulty absorbable aerosols of oils, fats and plasticisers, which are emulsifiable in the aqueous phase, can be separated from air in high percentages. Sulfuric acid aerosols and sulfur trioxide, which ordinarily are absorbed in concentrated sulfuric acid, can be absorbed with water.

The process of the present invention for the separation of chemical air impurities from air-gas mixtures comprises the steps of distributing an absorbent medium over at least one pack of stratified filter mats carried in a reaction tower, introducing the air-gas mixture to the filter mats and creating a flow of air through the tower whereby the air-gas mixture is drawn through the filter mats and exits from the tower substantially free of chemical impurities. Absorbent medium such as caustic soda, sodium hypochlorite, water, hydrogen peroxide and mixtures thereof is particularly useful for the removal of the oxides of nitrogen.

The operation of the process requires that air containing one or more of the foregoing chemical impurities be passed through at least one or more packs of stratified filter mats. The mats comprise chemical-proof unwoven fabrics such as polypropylene which carry the absorbents. The filter mat pack or packs are compressed from 10 to 50 percent or more of their initial volume depending upon the concentration of the substances to be separated in the air-gas mixture. Metering of the quantities of absorbent medium to be fed to the air-gas mixture is facilitated, according to the invention, by regulation of pH, oxidation-reduction or by colorimetric measurement. It is also possible, according to the present invention, to separate out nitric acid in a concentration suitable for re-use in the initial process viz., which can be removed separately and recycled to the initial industrial process. The apparatus for carrying out the process of the present invention, that is, the separation of chemical air impurities from air-gas mixtures, comprises a reaction tower into which the air-gas mixture is introduced, aperture means in a wall of the tower, at least one filter means carried in the reaction tower, means for distributing an absorbent medium onto the filter and, fan means provided in the aperture for creating a flow of air through the reaction tower to draw the air-gas mixture through said filter means for the separation of substantially all of the impurities therefrom.

In alternative embodiments, the apparatus can have more than one filter pack, as will be discussed hereinbelow, and the fan may be arranged to force impurity-laden air into the reaction tower, whereby clean air is exhausted therefrom, or the fan can be employed to draw the clean filtered air from the reaction tower. In either instance, the flow of air through the reaction tower and filter, to contact the absorbent media, is provided by the fan.

PREFERRED MODE FOR CARRYING OUT THE INVENTION

Figure 1:
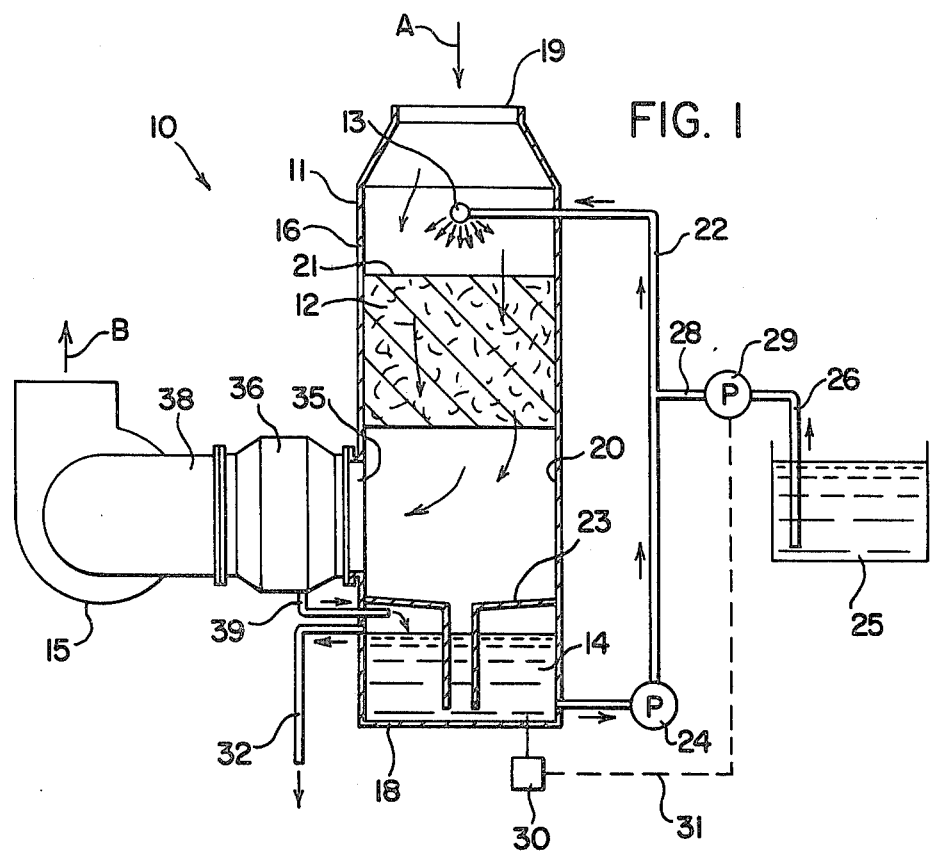
FIG. 1 is a side elevation schematically depicting the apparatus of the present invention.

The apparatus of the present invention is designated generally by the numeral 10 in FIG. 1 and basically comprises a reaction tower 11, a filter means 12, distributing means 13 for applying an absorbent medium onto the filter means, collecting means 14 for collection of the absorbent medium and fan means 15 for passing air through the reaction tower 11.

The reaction tower 11, depicted in FIG. 1, comprises an upright cylindrical member having an exterior wall 16, a base or bottom 18 and a top 19. The air-gas mixture containing impurities is passed into the reaction tower 11 in the direction of the arrow A via a suitable inlet pipe, not shown.

The filter means 12, comprises a filter pack one of which is depicted in FIG. 1. The filter pack, in turn, comprises several filter mats each of which is formed from several layers of unwoven fabrics. The filter pack 12 is removably affixed to the inner wall 20 of the tower 11 in any convenient manner known to those skilled in the art. Such means for mounting are not shown but could include, for example, resting of the filter upon a bracket or flange, or the connecting of a flange from the filter to the reaction tower wall 20. Each individual filter pack is made up of several filter mats. The filter mats may be of the same or different materials, depending upon their compressibility as well as the compression required. It is desirable that the filter mats comprise a chemical proof unwoven fabric; generally polypropylene is employed as such mats are resistant to substantially all chemicals contacted during the absorption process. It is to be understood, however, that polypropylene is merely exemplary and that suitable substitutes can be made as a particular absorption process or economics may require.

As to the compression of the filter mats, the filter mats have a thickness of about 20 mm in normal state. The pack density, attributed to compression, ensues in the course of operation by alternate arrangement of the filter mats. Typically, two different types of filter mats are selected: one, which is compressed by the absorption medium to about 50 percent of the initial volume and, one which is compressed to about 20 percent of the initial volume. Selection and arrangement of these two filter mats are made so as to achieve the preferred pack density by virtue of the absorption medium being pumped onto the mats, through the distributing means 13, by means of a circulation pump.

Immediately above the filter pack 12, is the distributing means 13 for the absorbent medium which, in FIG. 1, is a spray nozzle. The nozzle 13 is arranged above the filter pack so that it can disperse the absorbent medium evenly over the upper surface 21 of the filter pack. The spray nozzle 13 is connected, via a conduit 22 with the collection means 14, a vessel situated in the bottom of tower 11. The vessel 14 has a collection hopper 23 which receives the absorbent medium and channels it downwardly. A pump 24 is provided in the conduit 22 to recirculate the absorbent from the vessel 14 to the spray nozzle 13. Replenishment of the absorbent is from a tank or reservoir 25, through conduits 26 and 28 by means of a pump 29, and into the conduit 22. In order to regulate the feed of the absorbent to the spray nozzle 13, a measuring and regulating unit 30 is provided in a separate conduit 31 from the vessel 14 to the pump 29. Lastly, overflow of the vessel 14 is facilitated by a separate conduit 32, suitably located from that purpose.

As can be understood from the drawing, the absorbent medium is continuously provided to the compressed filter mats via the circulation pump 24. Recirculation volume is not regulated as to excess feed, so long as an amount is fed to the filter pack or packs for commensurate with its holding capacity. As an example of a sufficient amount, one cubic meter of compressed filter mats will retain approximately 0.4 cubic meter of absorbent medium.

Metering of the absorption medium can be regulated by pH, oxidation reduction or colorimetric measurement so that the amount of spent chemicals can be supplemented. In the instance of the absorption of $NO_x$, hydrogen peroxide is employed as the absorbent and the absorption tower will contain nitric acid formed by the combination of two moles of $NO_2$ and one of $H_2O_2$ to form two moles of $HNO_3$. Parenthetically, the nitric acid can be returned to the industrial process e.g., nitration, pickling and the like, which produced the $NO_x$ impurities initially.

Returning to the absorbent liquid, hydrogen peroxide, the solution will contain an excess amount of about 1 gram/liter of hydrogen peroxide which will be continuously compared with an equivalent solution of potassium permanganate. In normal practice, the potassium permanganate is used up by the hydrogen peroxide and the solution will show a potential of 750 mV. When the concentration of hydrogen peroxide falls below a value of 1 gram/liter, potassium permanganate will be present in excess and a potential of 1250 mV will be indicated. The increase in potential will then signal the metered addition of hydrogen peroxide. Where alkaline reacting impurities are being absorbed, the pH can be set, for example, to 3 and whenever that value is exceeded, acidic absorbent material would be added. Similarly, where acid reacting impurities are absorbed, the pH is set, for example, to 11, and when the pH drops below that value, alkaline absorbent medium would be added.

The absorbent medium, as discussed hereinabove, can be caustic soda or sodium hypochlorite and mixtures of the two, hydrogen peroxide and water and mixtures of all the foregoing. Particularly useful is hydrogen peroxide in concentration of from about 35 to 50 percent. More generally, impurities soluble in water can be removed by water; acid reacting aqueous solutions can be used for removal of ammonia or organic amines; alkaline reacting aqueous solutions can be employed for removal of halogens and halogen acids as well as phenols, mercaptans, organic acids and the like or, reducing or oxidizing aqueous solutions can be employed. It will be appreciated by those skilled in the art that selection of a specific absorption medium will depend upon the particular chemical impurities sought to be removed from air and therefore practice of the present invention is not to be limited solely by those absorbents discussed herein.

Returning to FIG. 1, between the hopper 23 and the underside of the filter 12, an aperture 35 is provided in tower wall 16. A droplet separator 36 is connected at the aperture and is connected to the fan 15 by way of a conduit 38 to exhaust clean air from the tower 11, in the direction of the arrow B, to the atmosphere or ductwork, not shown. A discharge conduit 39 is provided from the bottom of the separator 36 to return any absorbent medium collected therein to the collecting vessel 14.

In operation, the air-gas mixture passes in the direction of the arrow A into the reaction tower 11 and is brought together with the absorbent in the filter mat pack 12, which is impregnated with the absorbent sprayed thereover via nozzle 13. Reaction between the absorbent and the impurities produces a material which, after it has left the filter pack 12, travels by way of the collecting hopper 23 into the collecting vessel 14, while the air and slight liquid constituents still contained therein are drawn from the reaction tower 11 through the aperture 35. The liquid residues are precipitated in the droplet separator 36 and pass likewise through the conduit 39 into the collecting vessel 14, while the purified air is blown from the tower by the fan 15. Useful by-products of the filtering process, such as nitric acid, could be removed from separator 36 or collecting vessel 14 and recycled to the original industrial process. Such separation of nitric acid is within the skill of the art and need not be explained herein.

During operation of the apparatus 10, residence time of the impurity-laden air in the reaction tower is from about 0.05 to 60 seconds, depending on the height of the filter pack as well as the type of impurity. Regulation will, in turn, depend upon quantity of impurities to be removed, and usually ranges between the intervals of from 10 seconds to 10 minutes. With respect to reaction temperatures, these are principally not critical so long as the thermal stability of the tank, filter packs and the like is not impaired. While an upper limit may be about 100° C., typical operating temperatures range from about 0° to about 80° C.

Figure 2:
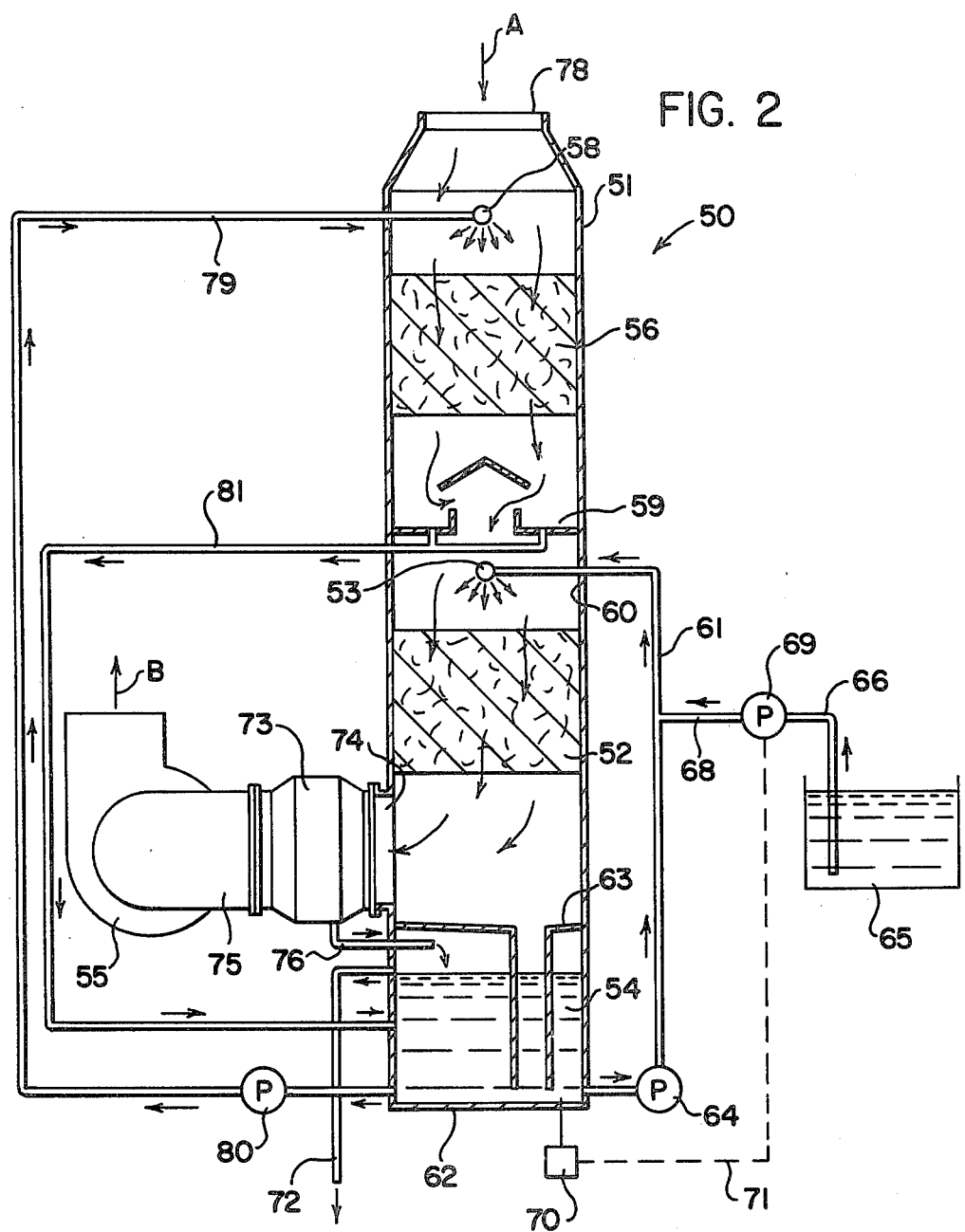
FIG. 2 depicts another embodiment of the present invention.

An alternate embodiment is provided in FIG. 2 and is depicted generally by the numeral 50. As for the apparatus set forth in FIG. 1, the apparatus 50 basically comprises a reaction tower 51, a first filter means 52, first distributing means 53, first collecting means 54 and fan means 55. Additionally, a second filter means 56, second distributing means 58 and second collecting means 59 are employed.

As is readily apparent from FIG. 2, the first filter 52, which comprises a filter pack as set forth hereinabove, is removably affixed to the inner wall 60 of the tower 51 in any suitable manner. The first spray nozzle 53 is arranged above the filter 52, and is supplied with absorbent, via conduit 61, extending from the first collection means 54, a vessel located in the bottom of the tower 62. The vessel 54 also has a collection hopper 63 to channel the absorbent medium to the tower bottom. A pump 64 is provided in conduit 61 to recirculate the absorbent from the vessel to the spray nozzle 53. A tank 65 is also provided to replenish the absorbent through conduits 66 and 68, by means of a pump 69, and into conduit 61. A regulator 70 is provided in a separate conduit 71 between the vessel 54 and pump 68. Lastly, overflow is controlled by a conduit 72.

A droplet separator 73 is provided in an aperture 74 of the tower wall 60 and is connected via conduit 75 to the fan 55 which serves to draw air through the tower 51 and into the atmosphere in the direction of the arrow B. A discharge conduit 76, from the droplet separator, returns the absorbent to the vessel 54.

The differences between FIGS. 1 and 2 is that the latter provides an additional, separate filter pack 56 between the inlet 78 of the tower and the first filter pack 52. A second spray nozzle 58, located above filter pack 52, is fed via conduit 79 from the vessel 54, a pump 80 being provided in the line to transfer the absorbent. Between the two filters 52 and 56 the second collecting vessel 59, depicted schematically, is interposed which is connected via conduit 81 to the first vessel 54.

Operation of the apparatus 50 is similar to that of the apparatus 10 with impurity-laden air-gas mixture entering the tower, in the direction of the arrow A, passing through the filters 52 and 56 and out of the tower via the droplet separator 72 and fan 55.

Figure 3:
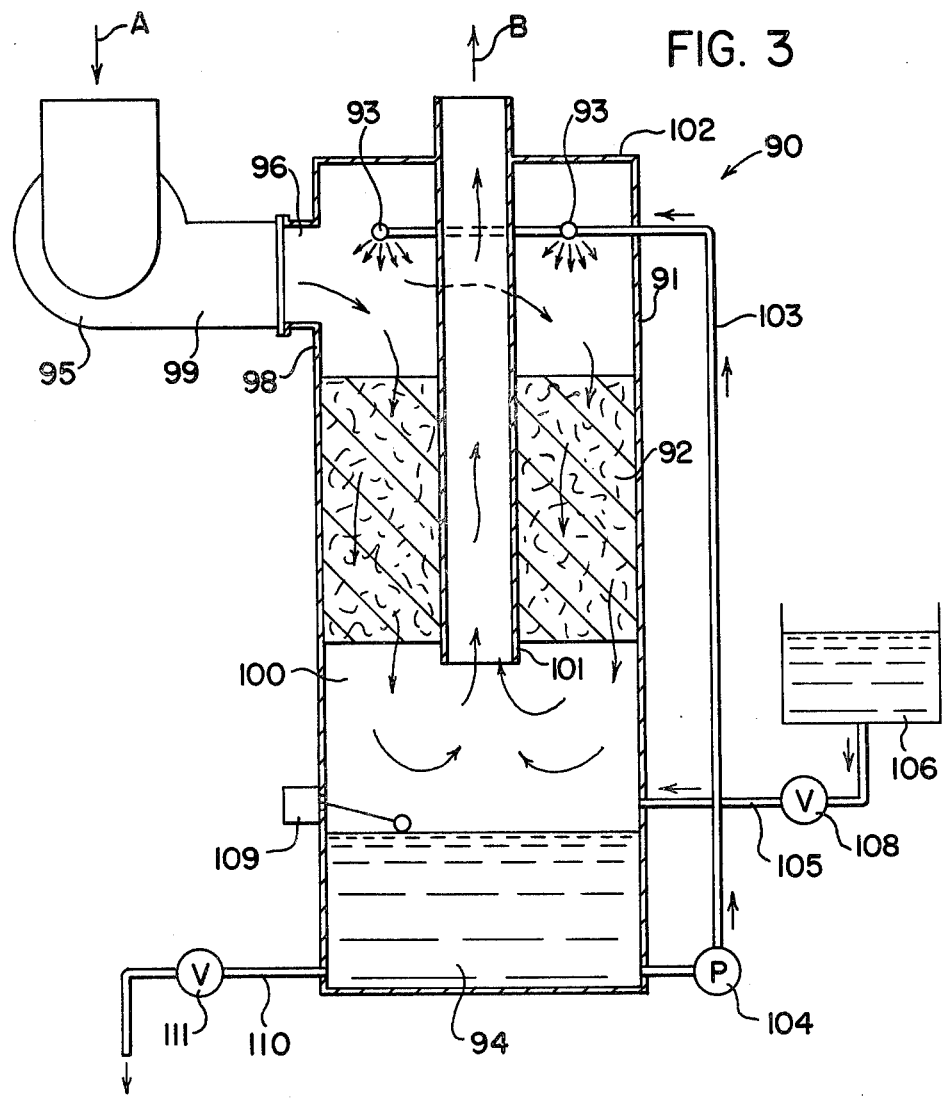
FIG. 3 depicts a further embodiment of the present invention.

For the embodiment depicted in FIG. 3, the apparatus 90 also comprises a reaction tower 91, a filter mat pack 92, two or more distributing means or spray nozzles 93 and collection vessel 94. A fan 95, is also provided, however, rather than exhausting clean air from the tower 91, it is connected to an inlet 96 in the tower wall 98, via conduit 99, to force impurity-laden air-gas mixtures into the tower for separation. Once inside of the tower, the air-gas mixture is forced simultaneously through the filter 92 and exists therebelow into a chamber 100.

An exit pipe 101 passes through the top 102 of the tower, separating the filter and communicating with the chamber 100, to exhaust filtered air therefrom in the direction of the arrow B. Otherwise, the apparatus 90 is similar to the ones described hereinabove, the spray nozzles 93 being fed through a conduit 103 connected to the vessel 94, with absorbent being moved by a pump 104. The collection vessel 94 is also fed via conduit 105 with fresh absorbent material from a tank 106 controlled by a valve 108; it is provided with a level regulator 109 and, it has a drainage conduit 110 controlled by a valve 111.

Operation of the foregoing apparatus according to the process of the present invention has been reported in Tables I, II and III. For purposes of comparison, four different systems have been compared with the apparatus and process of the present invention and each has been operated with one of four different absorbent media. Table I represents the separation of nitrogen dioxide ($NO_2$); Table II represents the separation of nitrogen trioxide ($NO_3$) or nitrogen dioxide/nitrogen oxide ($NO_2/NO$) in a 1:1 molar ratio and, Table III represents the separation of nitrogen oxide (NO).

TABLE I

| | Separation of $NO_2$ | | | |
| | Absorbent Agent | | | |
| Washer Type | Caustic soda | Caustic soda - sodium hypochlorite | Water | Water - hydrogen peroxide |
| --- | --- | --- | --- | --- |
| 10-story plate column | 60-80% | 60-80% | 40-60% | 60-80% |
| Packed column 4-6 m pile | 60-80% | 60-80% | 40-60% | 40-70% |
| Spray washer | 30-50% | 30-50% | 10-30% | 30-50% |
| Venturi washer | 40-70% | 40-70% | 30-50% | 30-60% |

TABLE I-continued

Separation of NO₂

| Washer Type | Absorbent Agent | | | |
|---|---|---|---|---|
| | Caustic soda | Casutic soda - sodium hypo- chlorite | Water | Water - hydrogen peroxide |
| Filter mat washer | 90–98% | 95–99.5% | 70–80% | 95–99.9% |

TABLE II

Separation of N₂O₃ or NO₂/NO in molar ratio 1:1

| Washer Type | Absorbent Agent | | | |
|---|---|---|---|---|
| | Caustic soda | Casutic soda - sodium hypo- chlorite | Water | Water - hydrogen peroxide |
| 10-story plate column | 60–80% | 60–80% | 20–50% | 40–60% |
| Packed column 4–6 m pile | 60–80% | 60–80% | 20–50% | 40–60% |
| Spray washer | 30–50% | 30–50% | 10–30% | 20–50% |
| Venturi washer | 40–60% | 40–60% | 10–40% | 20–50% |
| Filter mat washer | 90–99% | 95–99.5% | 50–70% | 95–99.9% |

TABLE III

Separation of nitrogen oxide NO

| Washer Type | Absorbent Agent | | | |
|---|---|---|---|---|
| | Caustic soda | Casutic soda - sodium hypo- chlorite | Water | Water - hydrogen peroxide |
| 10-story plate column | 0–10% | 0–30% | 0–10% | 0–30% |
| Packed column 4–6 m pile | 0–10% | 0–30% | 0–10% | 0–30% |
| Spray washer | 0–10% | 0–20% | 0–10% | 0–20% |
| Venturi washer | 0–10% | 0–30% | 0–10% | 0–30% |
| Filter mat washer | 0–20% | 50–70% | 0–10% | 90–95% |

By examining the data presented in the three Tables, it is immediately evident that the apparatus of the present invention, designated "Filter mat washer" provided substantially better results than the four systems with which it is compared. More specifically, in Table I the separation of NO₂ was best facilitated utilizing either caustic soda and sodium hypochlorite as the absorbent or water and hydrogen peroxide. Even water alone performed as well as any of the other absorbents when the latter were employed in known apparatus.

Similar results are observed for Table II wherein N₂O₃ or NO₂/NO were removed. In the separation of nitrogen oxide (Table III) using hydrogen peroxide as the absorbent, the increase of the degree of separation by comparison with the results achievable with other apparatus is particularly distinct, inasmuch as it was possible to achieve 90 to 95% removal, compared with 30% and less for the known apparatus. The results utilizing hydrogen peroxide as the absorbent are of great economic significance due to the recovery of nitric acid, which otherwise saves neutralization and decontamination costs for oxidation of any nitrates that would be formed. In the case of absorption of nitrogen dioxide, a 44% nitric acid resulted; in the absorption of nitrogen trioxide, a 26% nitric acid resulted and, in the absorption of nitrogen oxide, even a 17% nitric acid resulted. Utilizing even more highly concentrated hydrogen peroxide solutions has made it possible to produce nitric acids of correspondingly higher percentage.

Based upon the high percentage of impurities that were removed from contaminated air, as reported in the Tables, when the apparatus and process of the present invention were employed, it should be apparent that the objects of the invention have been met. It is to be understood that the apparatus disclosed herein, as stated hereinabove, can clearly include one or more packs of filter mats. It should also be apparent to those skilled in the art that the process of the subject invention is operable with a multitude of different liquid absorbent materials, depending upon such factors as the particular impurity being treated, the form in which it is being removed after treatment and economics. Typically, other impurities that could be removed from air in an apparatus of the present invention according to the process disclosed include the halogen gases and halogen acids i.e., fluorine, chlorine and bromine, silicon tetrafloride, hydrogen sulphide, sulphur dioxide, sulphur trioxide, ammonia, ammonium chloride, ammonium fluoride, indium chloride, and the like and organic liquid phase absorbable impurities, such as amines, phenols, mercaptans, alcohols, acids, aldehydes, ketones.

While use of the apparatus and process has been demonstrated by the removal of various oxides of nitrogen from air, these examples have been provided merely to demonstrate operability and, therefore, the selection of specific absorbents and reaction conditions for separation and removal of impurities from air can be determined without departing from the spirit of the invention herein disclosed and described. Moreover, the scope of the invention shall include all modifications and variations that may fall within the scope of the attached claims.

I claim:

1. In a process for the separation of chemical air impurities from air-gas mixtures comprising the steps of: distributing an absorbent medium in a reaction tower; introducing said air-gas mixture to said tower; and creating a flow of air through said tower whereby said air-gas mixture is drawn through said tower and exits from said tower, the improvement comprising carrying out the process with at least one pack of stratified nonwoven fabric filter mats in the tower; the absorbent medium being distributed over said filter mat and the flow of air passing through said filter mat whereby the air is substantially freed of chemical impurities.

2. A process, as set forth in claim 1, comprising the additional steps of:
collecting said absorbent medium passing through said filter mats; and
continuously redistributing it thereover.

3. A process, as set forth in claims 1 or 2, wherein said absorbent medium is hydrogen peroxide.

4. A process, as set forth in claim 3, wherein said impurities are selected from the group consisting of the oxides of nitrogen and mixtures thereof.

5. A process, as set forth in claim 4, wherein said absorbent medium comprises hydrogen peroxide and the reaction of said oxides of nitrogen therewith produces nitric acid.

6. A process, as set forth in claim 3, wherein said filter pack is compressed from about 10 to about 50% of its initial volume depending upon the concentration of the substances to be separated in the air-gas mixture.

7. A process, as set forth in claim 3, including the additional steps of metering and replenishing said absorbent medium fed to said filter mats.

8. A process, as set forth in claim 7, wherein said step of metering includes determining and regulating the pH valve of said medium.

9. A process, as set forth in claim 7, wherein said step of metering is determined by oxidation-reduction.

10. A process, as set forth in claim 7, wherein said step of metering is determined by colorimetric measurement.

11. A process, as set forth in claim 6, wherein different filter mats in said filter pack are compressed different amounts.

* * * * *